US010369857B2

(12) United States Patent
Lavoie

(10) Patent No.: US 10,369,857 B2
(45) Date of Patent: Aug. 6, 2019

(54) METHODS AND APPARATUS TO CONTROL VEHICLE TILT

(71) Applicant: Ford Global Technologies, LLC, Dearborn, MI (US)

(72) Inventor: Erick Michael Lavoie, Dearborn, MI (US)

(73) Assignee: Ford Global Technologies, Dearborn, MI (US)

( * ) Notice: Subject to any disclaimer, the term of this patent is extended or adjusted under 35 U.S.C. 154(b) by 221 days.

(21) Appl. No.: 15/366,744

(22) Filed: Dec. 1, 2016

(65) Prior Publication Data

US 2018/0154727 A1 Jun. 7, 2018

(51) Int. Cl.
- *B60G 17/017* (2006.01)
- *B60G 17/018* (2006.01)
- *B60G 17/019* (2006.01)

(52) U.S. Cl.
CPC ......... *B60G 17/017* (2013.01); *B60G 17/018* (2013.01); *B60G 17/019* (2013.01); *B60G 2400/82* (2013.01); *B60G 2500/30* (2013.01); *B60G 2600/202* (2013.01); *B60G 2600/70* (2013.01); *B60G 2800/019* (2013.01)

(58) Field of Classification Search
CPC .. B60G 17/017; B60G 17/018; B60G 17/019; B60G 2400/82; B60G 2500/30; B60G 2600/202; B60G 2600/70; B60G 2800/019; B60G 2800/203; B60G 2800/204; B60G 17/0155; B60G 17/0523; B60G 2202/152; B60G 2202/412; B60G 2300/14; B60G 2400/202; B60G 2400/252; B60G 2400/952; B60G 2500/20; B60G 2500/2012; B60G 2800/20; B60G 2400/20; B60G 2400/30; B60G 2400/304; B60G 2400/38; B60G 2400/50; B60G 2400/90; B60G 2600/20; B60G 2800/22; B60G 2400/62; B60S 9/12; E05F 15/70; E05Y 2600/10; E05Y 2600/13; E05Y 2900/546
See application file for complete search history.

(56) References Cited

U.S. PATENT DOCUMENTS

| | | | | |
|---|---|---|---|---|
| 4,752,086 A | * | 6/1988 | Hotta | B62D 21/02 280/124.134 |
| 5,193,849 A | * | 3/1993 | Holzmann | B60G 17/0155 280/6.152 |
| 5,346,355 A | | 9/1994 | Riemer | |
| 5,452,919 A | * | 9/1995 | Hoyle | B60G 17/0155 280/5.505 |

(Continued)

FOREIGN PATENT DOCUMENTS

| | | |
|---|---|---|
| DE | 102005044240 | 3/2007 |
| DE | 102012009221 A1 * | 10/2013 ........... B60G 17/017 |

(Continued)

*Primary Examiner* — Stephen Holwerda
(74) *Attorney, Agent, or Firm* — Raymond Coppiellie; Hanley, Flight and Zimmerman, LLC

(57) ABSTRACT

Methods and apparatus to control vehicle tilt are disclosed. A disclosed example apparatus includes a plurality of actuators of a vehicle, where each actuator is to be length adjustable, and a controller communicatively coupled to the actuators, where the controller to vary a height of at least one of the actuators to adjust a tilt of the vehicle to facilitate loading or removal of an object relative to the vehicle.

18 Claims, 8 Drawing Sheets

(56) References Cited

U.S. PATENT DOCUMENTS

| | | | | |
|---|---|---|---|---|
| 6,098,995 A | * | 8/2000 | Danis | B60G 17/017 |
| | | | | 280/124.179 |
| 9,193,306 B2 | | 11/2015 | Espig | |
| 2004/0046337 A1 | * | 3/2004 | Sproatt | B60S 9/12 |
| | | | | 280/6.156 |
| 2005/0110229 A1 | * | 5/2005 | Kimura | B60G 17/017 |
| | | | | 280/5.514 |
| 2009/0216403 A1 | * | 8/2009 | Holbrook | B60G 17/0521 |
| | | | | 701/37 |
| 2013/0144494 A1 | * | 6/2013 | Mayr | B60G 17/017 |
| | | | | 701/48 |

FOREIGN PATENT DOCUMENTS

| | | |
|---|---|---|
| DE | 102014106473 | 11/2015 |
| JP | 10138843 | 5/1998 |
| KR | 20040050207 | 6/2004 |

* cited by examiner

METHODS AND APPARATUS TO CONTROL VEHICLE TILT

FIELD OF THE DISCLOSURE

This disclosure relates generally to vehicles and, more particularly, to methods and apparatus to control vehicle tilt.

BACKGROUND

Loading and unloading of vehicles such as cars or trucks, for example, can be difficult in situations where an object is placed/stored in an awkward position relative to the vehicle and/or involving ergonomic limitations related to reaching or placing the object. For example, an object loaded onto a roof of a car may be difficult to reach by a person based on a person's height, strength and/or flexibility. Additionally, the person may have difficulty accessing a portion of the object meant to facilitate removal or loading (e.g., a handle or other grabbing implement) from the car.

SUMMARY

An example apparatus includes a plurality of actuators of a vehicle, where each actuator is to be length adjustable, and a controller communicatively coupled to the actuators, where the controller to vary a height of at least one of the actuators to adjust a tilt of the vehicle to facilitate loading or removal of an object relative to the vehicle.

An example method includes determining, by executing instructions with at least one processor, a desired orientation angle of a vehicle to facilitate loading or unloading of an object relative to the vehicle. The example method also includes varying a length of at least one adjustable actuator of the vehicle to cause the vehicle to be at the desired orientation angle.

An example tangible machine readable medium comprises instructions, which when executed, cause a processor to at least calculate a desired tilt angle of a stationary vehicle to facilitate loading or unloading of an object relative to the vehicle, and cause at least one actuator of the vehicle to tilt the vehicle at the desired tilt angle.

Figure 1:
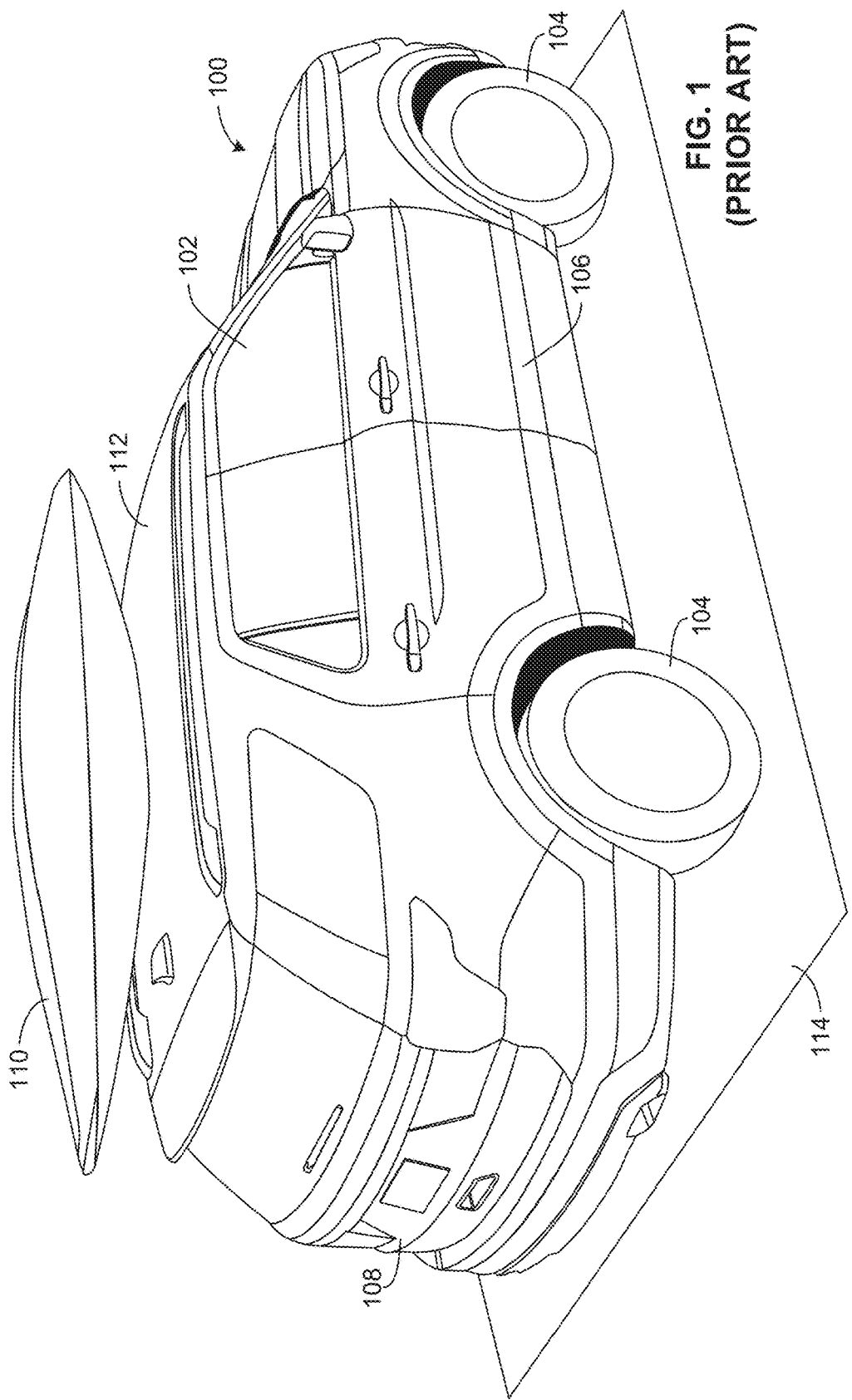
FIG. 1 is an example vehicle in which the examples disclosed herein may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Methods and apparatus to control vehicle tilt are disclosed. Loading or unloading an object onto or from a vehicle can be challenging due to physical limitations such as a height of a person and/or a difficult-to-reach storage/mounting location of the object. For example, reaching an object on a car roof can be difficult for persons that do not have a requisite height and/or have difficulty moving their arms above a certain height over their shoulders.

The examples disclosed herein facilitate storing and unloading of an object from a vehicle. In particular, the examples disclosed herein utilize adjustable height and/or shape elements such as actuators (e.g., shocks/dampeners) to tilt/angle the vehicle so that a person can load or unload an object with relative ease. For example, a desired tilt or angle of the vehicle may be calculated or determined based on a deviation of the vehicle from being leveled (e.g., angled at a true horizontal). In some examples, the tilt or angle of the vehicle is adjusted based on terrain topography (e.g., measured from sensors, obtained from a GPS database, etc.). In some examples, the tilt or angle of the vehicle is adjusted based on physical characteristics and/or abilities of a person. Additionally or alternatively, the tilt or angle of the vehicle is adjusted based on a storage position and/or mass characteristics of the object.

As used herein, the terms "tilt" or "tilt of a vehicle" refers to an angled rotation of an entire vehicle, a vehicle chassis and/or cabin relative to a horizon (e.g., a true horizon, a ground horizon). As a result, the terms "tilt" and/or "tilt of a vehicle" may refer to a vehicle's relative orientation to a gravitational vector (e.g., a vector pointed towards a center of Earth). As used herein, the term "actuator" refers to any type of actuator, which can be mechanical, hydraulic, piezo-electric, magnetic and/or electromechanical, etc.

FIG. 1 is an example vehicle 100 in which the examples disclosed herein may be implemented. The vehicle 100 of the illustrated example includes a cabin 102, wheels 104, doors 106 and a trunk 108. In this example, an object (e.g., cargo) 110 is mounted on a roof 112 of the vehicle 100. Further, the vehicle 100 is parked on terrain (e.g., terrain of the surrounding area) 114, which can have varying grades (e.g., a non-level surface).

To access the object 110, which is a kayak secured to the roof 112 in this example, a person may have to reach to reach above the roof 112, which can be difficult (e.g., based on height and/or ergonomics) and/or strain the person encounters when the person tries to load or unload the object 110 from the roof 112. In some examples, an uneven grade of the terrain 114 may also further increase difficulties. In particular, the uneven grade of the terrain 114 may cause a further height mismatch between the person and the object 110.

Figure 2:
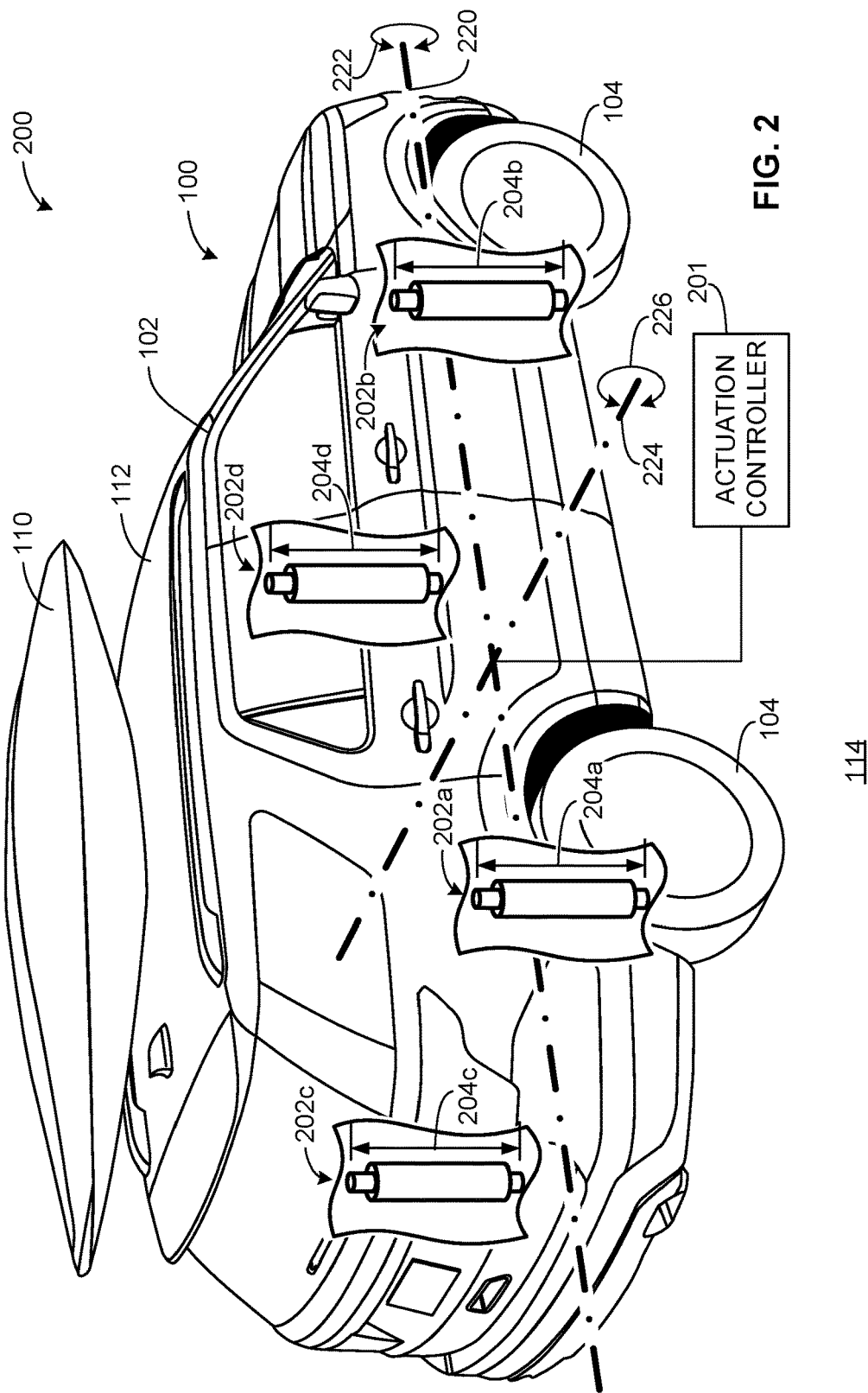
FIG. 2 illustrates an example vehicle leveling system in accordance with the teachings of this disclosure.

FIG. 2 illustrates an example vehicle leveling system 200 in accordance with the teachings of this disclosure. The example vehicle leveling system 200 includes an actuation controller 201, actuators (e.g., adjustable height actuators, adjustable shocks, shocks) 202 (hereinafter actuators 202*a*, 202*b*, 202*c*, 202*d*, etc.), which are adjustable length shocks/dampeners in this example, with corresponding respective lengths 204 (hereinafter lengths 204*a*, 204*b*, 204*c*, 204*d*, etc.).

To adjust a tilt (e.g., a tilt angle, angling, a skew angle, etc.) of the vehicle 100 to facilitate removal or loading of an object to the vehicle 100, the actuation controller 201 of the illustrated example adjusts a length of at least one of the actuators 202. In particular, the actuation controller 201 may lengthen or reduce a respective length of the at least one of the actuators 202 to tilt and/or orient the vehicle 100 by moving/displacing the wheels 104 relative to the chassis and/or the cabin 102 so that a person may more easily load or unload the object 110 onto/from the vehicle 100 (e.g., to load or unload the object onto/from the roof 112). In this example, the vehicle 100 may be tilted along at least one of a first rotational axis 220 (e.g., an axis that moves between a front side of the vehicle 100 to a rear side of the vehicle 100) along a direction generally indicated by a double arrow 222. Likewise, the vehicle 100 may be tilted along a second rotational axis 224 (e.g., an axis that extends between a left side of the vehicle 100 to a right side of the vehicle 100) along a direction generally indicated by a double arrow 226. In some examples, the actuation controller 201 coordinates a rotation of the chassis along both of the axes 220, 224 to tilt and/or rotate the vehicle 100 in multiple directions relative to the terrain 114 (e.g., a three-dimensional tilt of the vehicle 100, a tilt along multiple axes, etc.). In some examples, the vehicle 100 is lifted by multiple ones of the actuators 202 (e.g., all of the actuators 202) to increase ground clearance of the vehicle 100 so that a lower portion of the vehicle 100 can be accessed (e.g., for mounting or storage).

While the actuators 202, which are implemented as shocks of adjustable length/height in this example, are shown and described in the illustrated example of FIG. 2, any actuator and/or mechanical device to adjust a tilt of the vehicle 100 may be used. For example, a solenoid, hydraulic actuation, an electromagnet system and/or an expanding tire (e.g., an inflationary expansion tire, etc.).

Figure 3:
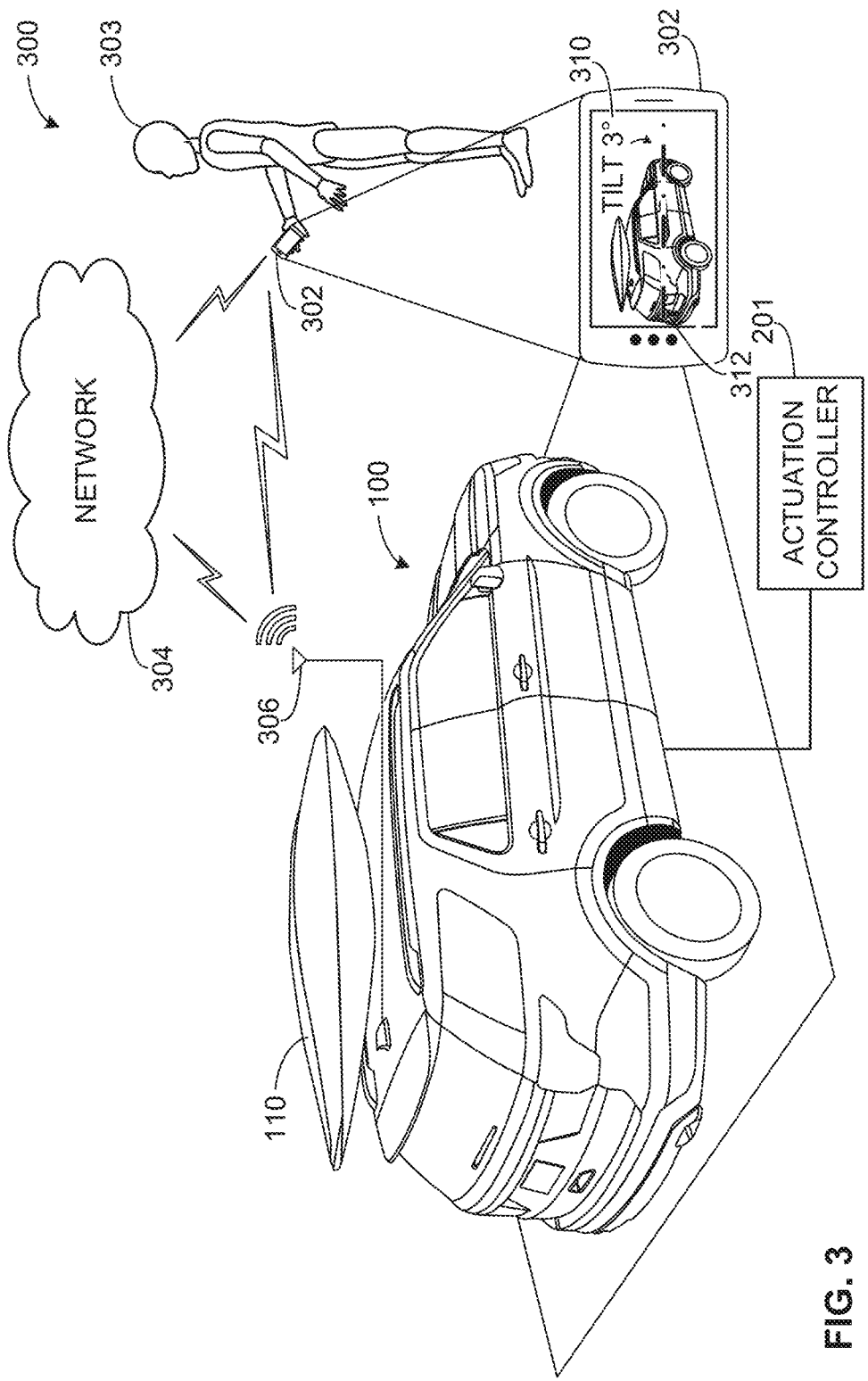
FIG. 3 illustrates an example communication system that may be implemented with the examples disclosed herein.

FIG. 3 illustrates an example communication system 300 that may be implemented with the examples disclosed herein. The communication system 300 of the illustrated example includes a portable device 302, which is operated by a user (e.g., a person, a driver, an owner of the vehicle 100, a driver or passenger of the vehicle 100, etc.) 303, a network (e.g., a wireless network, a cellular network, etc.) 304, and a vehicle communication system 306 of the vehicle 100.

According to the illustrated example, the user 303 provides inputs and/or a desired tilt angle of the vehicle 100 to the portable device 302. In particular, the user 303 of the illustrated example may input the desired tilt angle and/or input parameters to direct the actuation controller 201 to tilt the vehicle 100. In some examples, the actuation controller 201 may calculate/determine the desired tilt angle based on the provided input parameters.

In some examples, as can be seen in the detail illustrating a screen 310, the user 303 utilizes a camera of the portable device 302 so that the portable device 302 and/or the actuation controller 201 can calculate the desired tilt angle based on image data from the portable device 302. In such examples, the desired tilt angle may be calculated based on factors such as observed terrain topography/slant using this image data (e.g., camera data) captured at the portable device 302 and/or a level within or communicatively coupled to or disposed within the portable device 302. Additionally or alternatively, an augmented reality display is shown on the screen 310. For example, a desired tilt angle and/or possible tilt angles can be shown on the screen 310 to the user 303 as a desired angle line 312.

In some examples, the portable device 302 is in direct communication with the vehicle 100. In particular, the portable device 302 may utilize a wireless communication protocol such as Bluetooth, Wi-Fi, etc. to communicate with the vehicle 100. Alternatively, in some examples, the portable device 302 communicates with the vehicle 100 via the network 304.

While the actuation controller 201 of the illustrated example is generally shown to be controlled by the portable device 302, in some examples, the actuation controller 201 calculates the desired tilt angle based on measured or provided parameters received from and/or measured at the portable device 302 (e.g., user input provided at the portable device 302). These parameters may include, but are not limited to, terrain grade/level, current vehicle tilt relative to horizontal, physical condition, physical attributes and/or dimensions (e.g., height, arm length, etc.) of the user 303, shape and characteristics of the object 110, mass distribution and/or center of gravity of the object 110, and environmental condition(s) (e.g., rain, ice, etc.). In some examples, characteristics of the object 110 are identified by detecting an object identifier (e.g., a radio frequency identification (RFID) tag of the object 110). Additionally or alternatively, seasonal data (e.g., skis are loaded during the winter), pattern recognition (e.g., loading pattern recognition) and/or weather data is taken into account.

Figure 4:
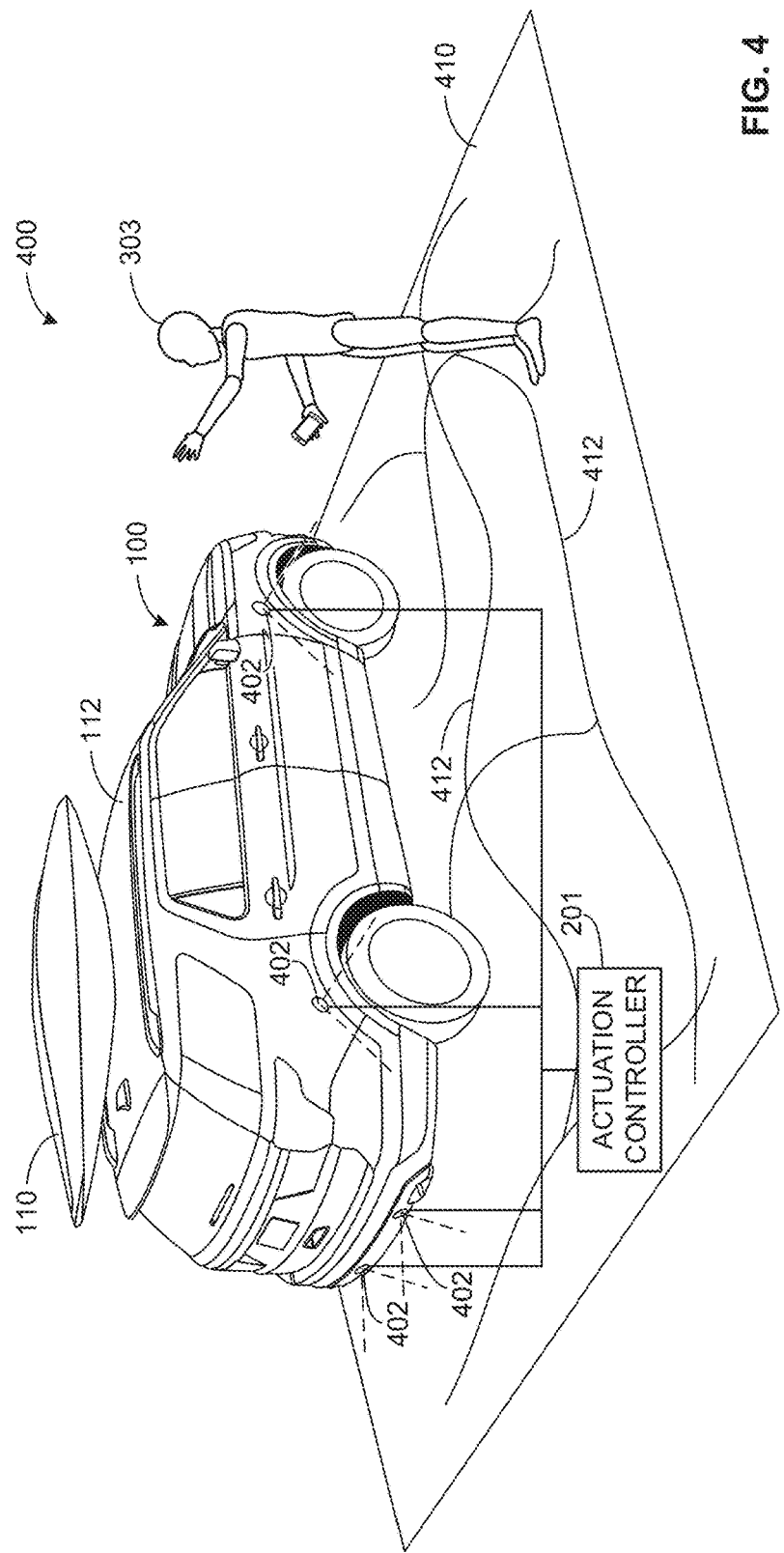
FIG. 4 illustrates an example sensor system that may be implemented with the examples disclosed herein.

FIG. 4 illustrates an example sensor system 400 that may be implemented with the examples disclosed herein. The example sensor system 400 includes sensors (e.g., vehicle sensors) 402, which are communicatively coupled to the actuation controller 201. The sensors 402 of the illustrated example may be levels, cameras, proximity sensors, tilt sensors, temperature sensors, gravitational sensors, motion sensors and/or infrared sensors, etc. In this example, the vehicle 100, which includes the object 110 stored thereon, is stationary (e.g., is in park and/or turned off) on terrain 410.

In this example, the sensors 402 measure a topography of the terrain 410 to determine or calculate a degree to which the actuator controller 201 will tilt or angle the vehicle 100 to facilitate access to the object 110 by the user 303. In particular, the sensors 402 of the illustrated example utilize camera imaging at multiple cameras to determine the topography. Additionally or alternatively, at least one of the sensors 402 measures an angle and/or level of the vehicle 100 sitting on the terrain 410 relative to a horizontal plane (e.g., a true horizontal measured by a gravitational sensor). In some examples, the sensors 402 take into account and/or measure surface profiles or contours 412 of the terrain 410.

In some examples, the sensors 402 are used to measure at least one property of the object 110 and/or placement of the object 110 relative to the vehicle 100. In particular, the sensors 402 may determine a relative position and/or orientation of the object 110 relative to the vehicle 100 so that the example actuator controller 201 can calculate and/or determine a desired tilt angle so that the user 303 can access and/or more easily access the object 110. In some examples, the sensors 402 detect a shape, a mass distribution and/or center of gravity of the object 110.

In some examples, the sensors 402 detect gestures and/or motions of the user 303 so that the actuator controller 201 can tilt the vehicle 100, as directed by the user 303. In other words, in such examples, the user 303 controls the tilt of the vehicle 100 by gestures and/or motions. For example, at least one of the sensors 402 may detect tapping of the roof 112 by the user 303 to initiate and/or control tilting of the vehicle 100. Additionally or alternatively at least one of the sensors 402 may detect a gesture movement (e.g., waving and/or a sequence of hand or arm gestures) of the user 303 to initiate and/or control tilting of the vehicle 100. In some examples, the sensors 402 detect whether the user 303 is carrying a large and/or heavy object, thereby causing the actuator controller 201 to initiate and/or control tilting of the vehicle 100. In other examples, the sensors 402 detect whether the user 303 has pushed the vehicle 100 to initiate and/or control tilting of the vehicle 100.

While the sensors 402 are described in this example as measuring certain parameters, the sensors 402 may be used to detect multiple different types of parameters and/or combinations of the parameters described above. For example, the sensors 402 may detect both terrain topography as well as any gestures provided by the user 303 using image/camera data, for example. Additionally or alternatively, the sensors 402 may be sensor clusters that include different types of sensors (e.g., imaging and gravitational, etc.).

Figure 5:
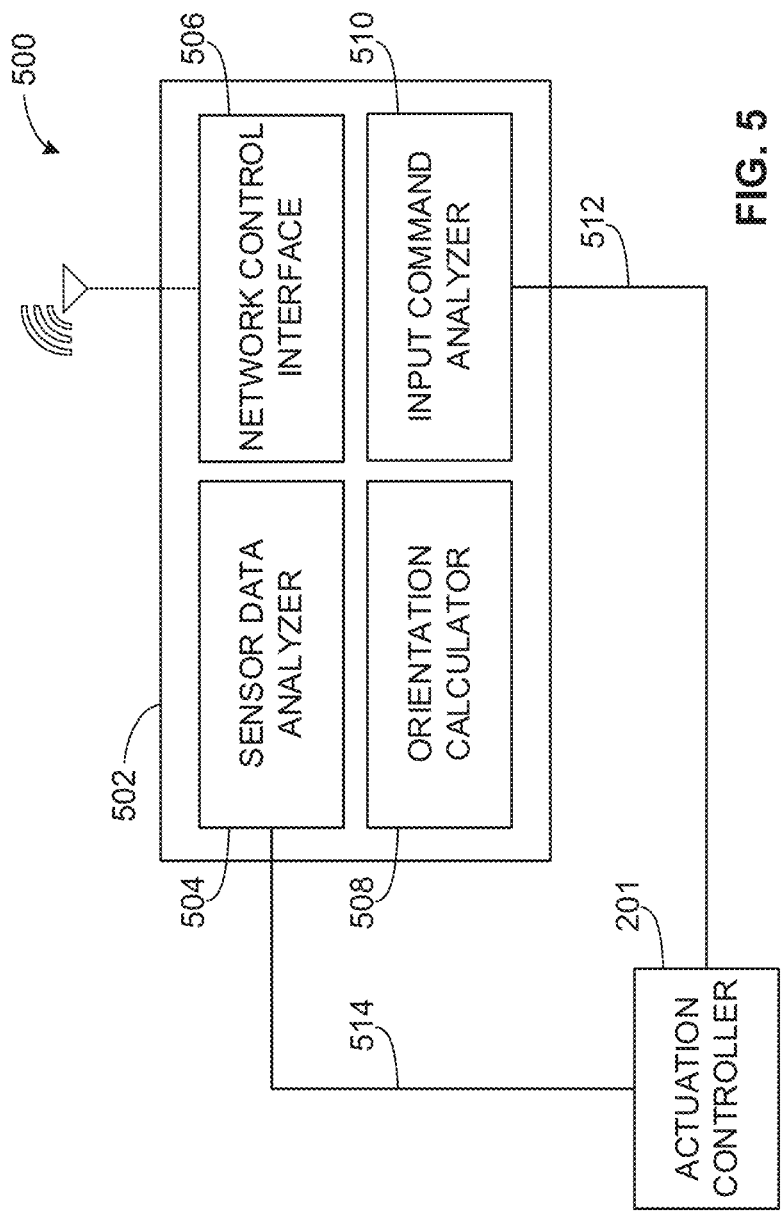
FIG. 5 is a schematic overview of a suspension tilt control system that may be used to implement the examples disclosed herein.

FIG. 5 is a schematic overview of a suspension tilt control system 500 that may be used to implement the examples disclosed herein. The suspension tilt control system 500 of the illustrated example includes a tilt controller 502, which includes a sensor data analyzer 504, a network control interface 506, an orientation controller 508 and an input command analyzer 510. The example suspension tilt control system 500 also includes the actuation controller 201, which is communicatively coupled to the input command analyzer 510 via a communication line 512. In this example, the actuation controller 201 is also communicatively coupled to the sensor data analyzer 504 via a communication line 514.

To determine and/or calculate a desired tilt and/or a tilt angle of the vehicle 100, the sensor data analyzer 504 of the illustrated example provides a measurement of a parameter such as a current measured tilt of the vehicle 100 from horizontal, for example, to the orientation calculator 508. Additionally or alternatively, the measurement may be a topography of surrounding terrain and/or physiological characteristics (e.g., height, arm length, etc.) of a person that will be loading or unloading the object 110. The measurement, in turn, is used to calculate the desired tilt angle. In some examples, the desired tilt angle is at least partially determined based on input provided to the input command analyzer 510 via the network control interface 506 (e.g., input commands transmitted from the portable device 302) and/or a portable device interface of the vehicle 100. In some examples, the desired tilt angle is determined based on a position and/or characteristic (e.g., a size and/or weight characteristic) of an object to the loaded or unloaded relative to the vehicle 100.

To direct movement of actuators (e.g., at least one of the actuators 202), the actuator controller 201 directs a lengthening and/or shortening of at least a portion of the actuators to tilt the vehicle 100 to the desired tilt angle. In some examples, some of the actuators may shorten while others are increased in length. Additionally or alternatively, in some examples, the actuator controller 201 coordinates simultaneous movement of multiple actuators to tilt the vehicle 100.

In some examples, the tilt controller 502 and/or the orientation calculator 508 defines a sequence (e.g., a time sequence) of tilt angles to which the vehicle 100 is to be oriented over a time period (e.g., a time function defining a sequence of ramp movements with periods of being stationary). For example, the vehicle 100 may be tilted at different angles over a certain time period to facilitate loading or removal of the object 110. Additionally or alternatively, a rate of movement to different tilt angles of the sequence are defined to facilitate loading or unloading from the vehicle 100.

In some examples, the tilt controller 502 is integral with the actuator controller 201. In some examples, the desired tilt angle is not calculated and, instead, the actuation controller 201 utilizes an input angle received at the network control interface 506 (e.g., from the portable device 302). In some examples, the input command analyzer 510 authenticates and/or verifies a user providing the desired tilt angle and/or a portable device 302 operated by the user.

While an example manner of implementing the suspension tilt control system 500 of FIG. 5 is illustrated in FIG. 5, one or more of the elements, processes and/or devices illustrated in FIG. 5 may be combined, divided, re-arranged, omitted, eliminated and/or implemented in any other way. Further, the example actuation controller 201, the example sensor data analyzer 504, the example network control interface 506, the example orientation controller 508, the input command analyzer 510 and/or, more generally, the example suspension tilt control system 500 of FIG. 5 may be implemented by hardware, software, firmware and/or any combination of hardware, software and/or firmware. Thus, for example, any of the example actuation controller 201, the example sensor data analyzer 504, the example network control interface 506, the example orientation controller 508, the example input command analyzer 510 and/or, more generally, the example suspension tilt control system 500 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example actuation controller 201, the example sensor data analyzer 504, the example network control interface 506, the example orientation controller 508, and/or the example input command analyzer 510 is/are hereby expressly defined to include a tangible computer readable storage device or storage disk such as a memory, a digital versatile disk (DVD), a compact disk (CD), a Blu-ray disk, etc. storing the software and/or firmware. Further still, the example suspension tilt control system 500 of FIG. 5 may include one or more elements, processes and/or devices in addition to, or instead of, those illustrated in FIG. 5, and/or may include more than one of any or all of the illustrated elements, processes and devices.

Figure 6:
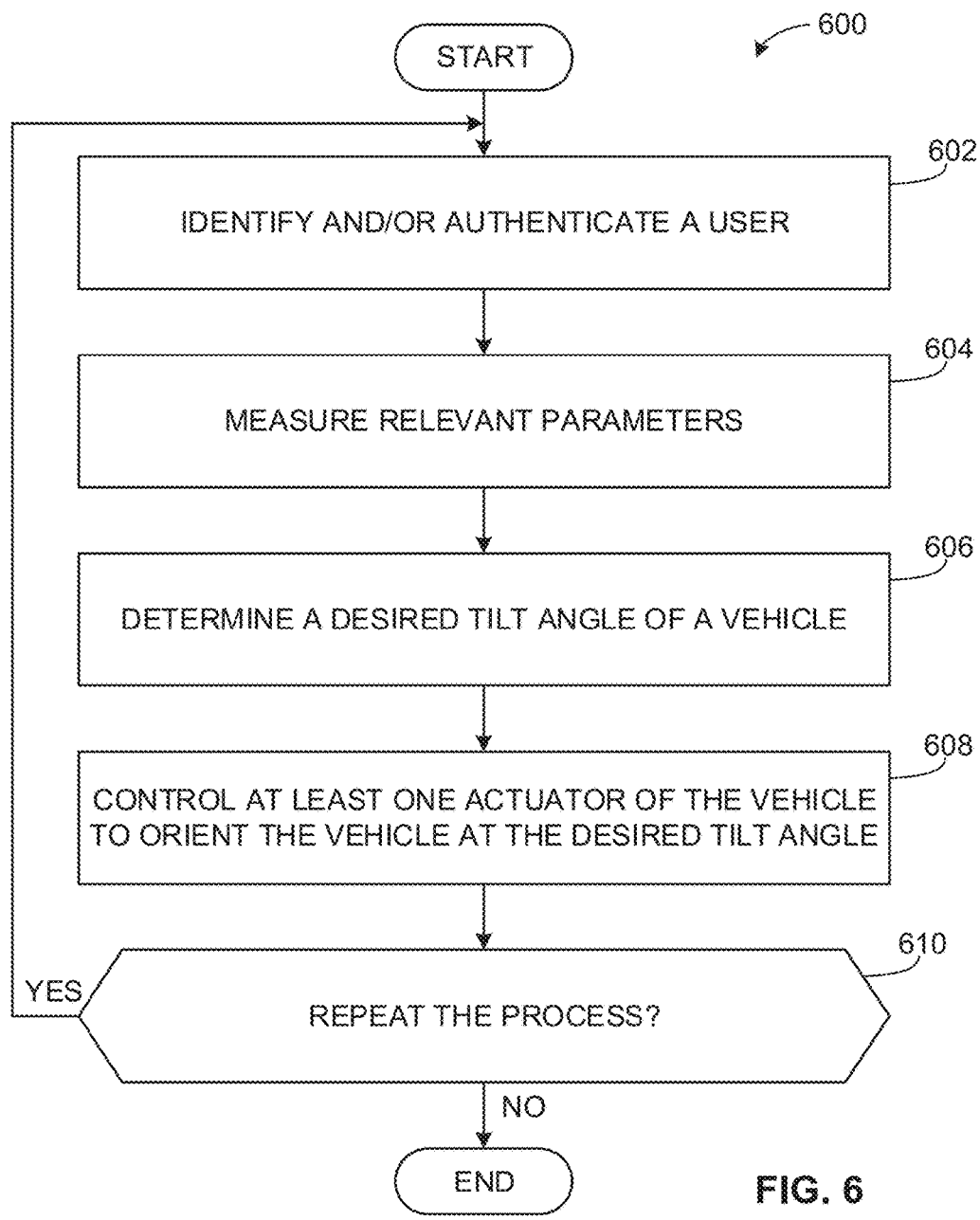
FIG. 6 is a flowchart representative of an example method that may be implemented by the suspension tilt control system of FIG. 5.
Figure 7:
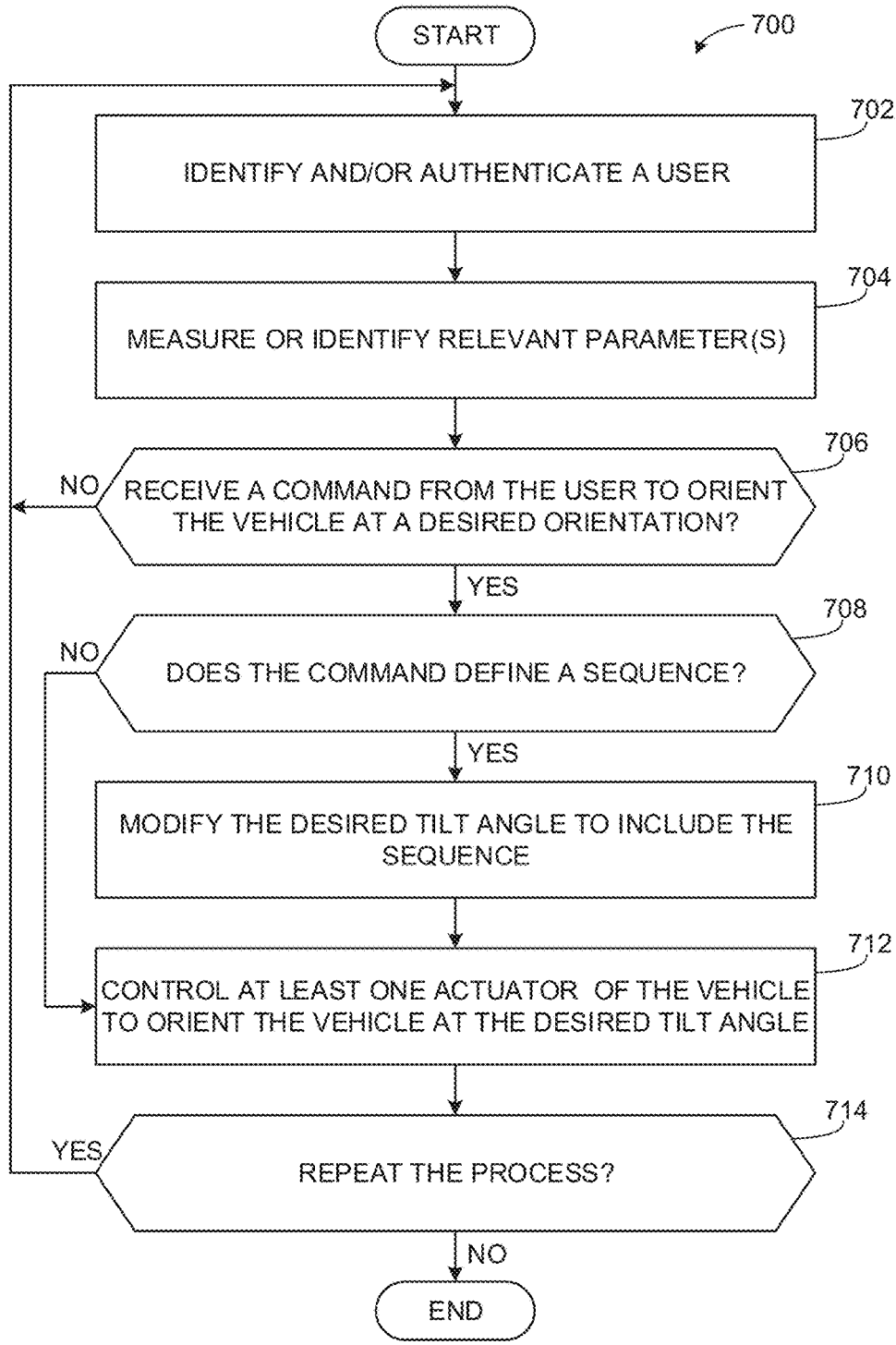
FIG. 7 is a flowchart representative of another example method that may be implemented by the suspension tilt control system of FIG. 5.

Flowcharts representative of example methods that may be used to implement the suspension tilt control system 500 of FIG. 5 are shown in FIGS. 6 and 7. In this example, the methods may be implemented using machine readable instructions that comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 6 and 7, many other methods of implementing the example suspension tilt control system 500 may alternatively be used. For example, the order of execution of the blocks may be changed, and/or some of the blocks described may be changed, eliminated, or combined.

As mentioned above, the example methods of FIGS. 6 and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6 and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method 600 of FIG. 6 begins as a user is about to load the object 110 onto the vehicle 100. In particular, the user is preparing to load the object 110 onto the roof 112 of the vehicle 100. In this example, the vehicle 100 is parked on a relatively flat (e.g., relative to horizontal) surface.

According to the illustrated example, the user is identified and/or authenticated (block 602). For example, the sensors 402 of the vehicle 100 may authenticate and/or identify the user. Additionally or alternatively, the portable device 302 is used to authenticate the user. In some examples, a presence of a key fob, facial recognition, voice recognition and/or a detected presence of the portable device 302 are used by the sensors 402 and/or the portable device 302 to authenticate the user.

In some examples, at least one relevant parameter is measured (block 604). In particular, the vehicle 100, the sensors 402 and/or the portable device 302 may measure a condition pertinent to the vehicle 100 to load/unload the object 110. In some examples, the sensors 402 measure a grade of the ground at which the vehicle 100 is standing on.

In this example, a desired tilt orientation of the vehicle is determined and/or calculated (block 606). In particular, the orientation calculator 508 of the illustrated example calculates the desired tilt orientation based on the measured parameter such as the aforementioned grade. For example, the orientation calculator 508 may calculate a tilt angle to level the vehicle 100 relative to horizontal.

According to the illustrated example, a height of at least one actuator (e.g., adjustable shock dampener, etc.) and/or a length element is controlled/adjusted to the desired tilt angle (block 608). For example, the actuator controller 201 coordinates length adjustment(s) of one or more of the at least one actuator to the desired tilt angle.

Next, it is determined whether the process is to be repeated (block 610). If the process is to be repeated (block 610), control of the process returns to block 602. Otherwise, the process ends. This determination may occur based on whether the object 110 has been loaded and/or unloaded.

The example method 700 of FIG. 7 begins as a user would like to remove the object 110 from the vehicle 100. In this example, the user directs a tilt of the vehicle instead of a desired tilt angle being calculated. According to the illustrated example, the vehicle 100 is directed to undergo a sequence of angular tilts (e.g., a timed sequence of angular tilt adjustments).

A user is identified and/or authenticated (block 702). In this example, the user is authenticated by the portable device 302.

Relevant parameter(s) are measured or identified (block 704). For example, the sensor 402 and/or the portable device 302 may measure a tilt of the vehicle 100 relative to a horizontal reference and/or gravitational vector.

It is then determined whether a command has been received from the user to orient the vehicle 100 to a desired tilt angle (block 706). If the command has not been received (block 706), control of the process returns to block 702. Otherwise, the process proceeds to block 708.

Next, if the command has been issued, it is determined whether the command defines a sequence (block 708). If the command defines a sequence, control of the process proceeds to block 710. Otherwise, the process proceeds to block 712.

In examples where the command defines a sequence, the desired tilt angle is modified to include the sequence (block 710). In other words, the desired tilt angle becomes a time-based function instead of a single value. In particular, the desired tilt angle is modified to include a timed sequence and/or pattern of tilt angles that very over time.

Next, at least one adjustable actuator (e.g., the actuator 202) of the vehicle 100 is controlled to orient the vehicle 100 at the desired tilt angle (block 712). In this example, numerous actuators of the at least one adjustable actuator are actuated and/or adjusted in length to orient the vehicle 100 at the desired tilt angle. In some examples different actuators are actuated at different times.

Next, it is determined whether the process is to be repeated (block 714). If the process is to be repeated (block 714), control of the process returns to block 702. Otherwise, the process ends. This determination may occur based on whether the sequence of tilt angles has been completed.

Figure 8:
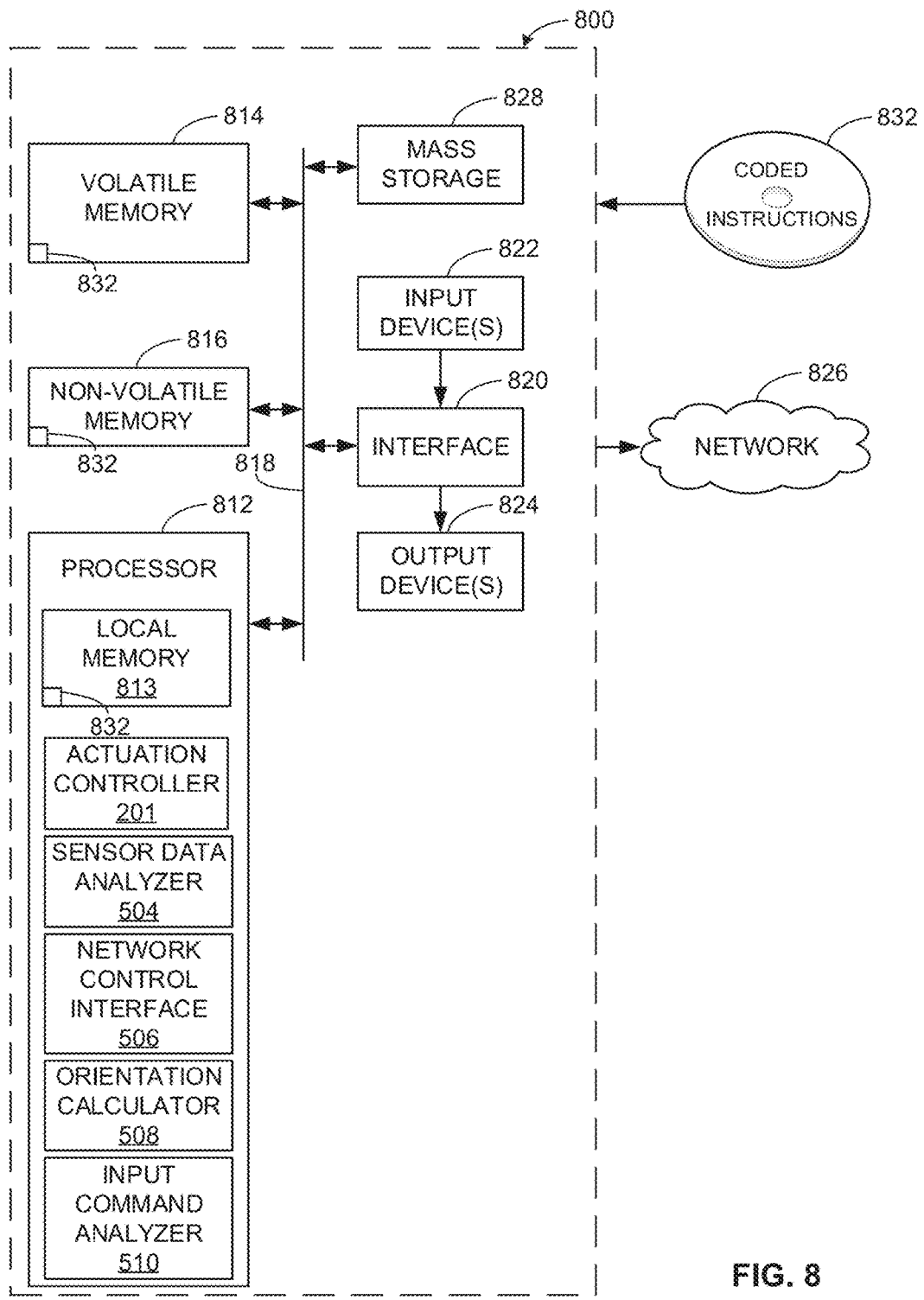
FIG. 8 is a processor platform that may be used to execute instructions to implement the example methods of FIGS. 6 and/or 7 and the example suspension tilt control system of FIG. 5.

FIG. 8 is a block diagram of an example processor platform 800 capable of executing instructions to implement the example methods of FIGS. 6 and 7 and the suspension tilt control system 500 of FIG. 5 The processor platform 800 can be, for example, a server, a personal computer, a mobile device (e.g., a cell phone, a smart phone, a tablet such as an iPad™), a personal digital assistant (PDA), a digital video recorder, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). In this example, the processor 812 also includes the example actuation controller 201, the example sensor data analyzer 504, the example network control interface 506, the example orientation controller 508 and the example input command analyzer 510. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 to implement the methods of FIGS. 6 and 7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture facilitate loading and unloading of objects from vehicles. The examples disclosed herein also enable convenient and user-specific and/or terrain specific tilt control of vehicles.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are generally shown related to vehicles, the examples disclosed herein may be applied to any other appropriate leveling or tilting application(s) (e.g., leveling a building, platform, spacecraft and/or boat, etc.).

What is claimed is:

1. An apparatus comprising:
a sensor to measure a height of a person;
a plurality of length adjustable actuators of a vehicle; and
a controller communicatively coupled to the actuators, wherein the controller varies, based on the measured height of the person, a height of at least one of the actuators, and wherein varying the height adjusts a tilt of the vehicle to facilitate loading or removal of an object relative to the vehicle.

2. The apparatus as defined in claim 1, further including a portable device interface that is communicatively coupled to a portable device, wherein the portable device controls the tilt of the vehicle.

3. The apparatus as defined in claim 1, wherein the sensor is a first sensor, and further including a second sensor, wherein the controller adjusts the tilt further based on data from the second sensor.

4. The apparatus as defined in claim 3, wherein the second sensor measures ground topography proximate the vehicle.

5. The apparatus as defined in claim 3, wherein the second sensor measures a location of an object on or within the vehicle.

6. The apparatus as defined in claim 3, wherein the second sensor determines a gesture performed by a person.

7. The apparatus as defined in claim 1, wherein the controller adjusts the tilt further based on a topography of an area proximate the vehicle.

8. The apparatus as defined in claim 1, wherein the vehicle is tilted about multiple axes.

9. The apparatus as defined in claim 1, further including an object identifier, wherein the controller adjusts the tilt of the vehicle further based on an identification of an object made by the object identifier.

10. The apparatus as defined in claim 1, wherein the actuators include shocks.

11. A method comprising:
measuring, via a sensor, a height of a person;
determining, by executing instructions with at least one processor, a desired orientation angle of a vehicle to facilitate loading or unloading of an object relative to the vehicle based on the measured height of the person; and
varying a length of at least one adjustable actuator of the vehicle, wherein varying the length of the at least one adjustable actuator causes the vehicle to be at the desired orientation angle.

12. The method as defined in claim 11, wherein the sensor is a first sensor, and further including measuring, via a second sensor, a topography of an area proximate the vehicle, wherein varying the length of the at least one adjustable actuator is based on the topography.

13. The method as defined in claim 11, wherein varying the length of the at least one adjustable actuator includes activating actuators of the at least one adjustable actuator at different times in a timed sequence.

14. The method as defined in claim 11, wherein determining the desired orientation angle of the vehicle is further based on a location of the object relative to the vehicle.

15. A tangible machine readable medium comprising instructions, which when executed, cause a processor to at least:
   calculate a desired tilt angle of a stationary vehicle to facilitate loading or unloading of an object relative to the vehicle based on a height of a person measured via a sensor; and
   cause at least one actuator of the vehicle to tilt the vehicle at the desired tilt angle.

16. The machine readable medium as defined in claim 15, wherein the instructions cause the processor to generate a timed sequence of tilt angles to facilitate the loading or the unloading of the object relative to the vehicle.

17. The machine readable medium as defined in claim 15, wherein the desired tilt angle of the vehicle is calculated based on the vehicle tilting about multiple axes.

18. The machine readable medium as defined in claim 15, wherein the desired tilt angle is calculated further based on input received from a portable device.

* * * * *